(No Model.) 2 Sheets—Sheet 1.

D. A. COOPER & W. H. LEWIS.
PROJECTING CAMERA.

No. 371,252. Patented Oct. 11, 1887.

Witnesses:
Geo. H. Miatt
D. W. Gardner

Inventors
David A. Cooper, and
William H. Lewis,
by Phillips Abbott, their
Attorney N. PETERS, Photo-Lithographer, Washington, D. C.

(No Model.) 2 Sheets—Sheet 2.

D. A. COOPER & W. H. LEWIS.
PROJECTING CAMERA.

No. 371,252. Patented Oct. 11, 1887.

Witnesses:
Geo. W. Miatt
D. W. Gardner

Inventors:
David A. Cooper
& William H. Lewis
by Phillips Abbott
their Attorney

N. PETERS, Photo-Lithographer, Washington, D. C.

UNITED STATES PATENT OFFICE.

DAVID A. COOPER AND WILLIAM H. LEWIS, OF BROOKLYN, ASSIGNORS TO E. & H. T. ANTHONY & COMPANY, OF NEW YORK, N. Y.

PROJECTING CAMERA.

SPECIFICATION forming part of Letters Patent No. 371,252, dated October 11, 1887.

Application filed May 28, 1887. Serial No. 239,616. (No model.)

*To all whom it may concern:*

Be it known that we, DAVID A. COOPER, a citizen of the Kingdom of Great Britain, and a resident of Brooklyn, in the county of Kings and State of New York, and WILLIAM H. LEWIS, a citizen of the United States, and a resident of said Brooklyn, have invented certain new and useful Improvements in Projecting Cameras, of which the following is a specification.

Our invention relates to improvements in "projecting cameras," so called, having special reference to particular instruments in that class known as "enlarging-cameras." Parts of our invention, however, are applicable to use in other kinds of cameras.

The general nature and object of our invention are to so construct the apparatus that it may be used either with diffused daylight or with artificial light by simply changing the location and relation of the parts; also, to improvements in the lamp used for the production of the artificial light; also, to improvements in the lens-holding frames, whereby they may be readily separated for cleansing or other purposes; also, to improvements whereby the presentation of the flame of the lamp to the lenses may be regulated and the focusing adjusted; and the invention also extends to certain details of construction of the parts, which will be hereinafter set forth.

Figure 1:
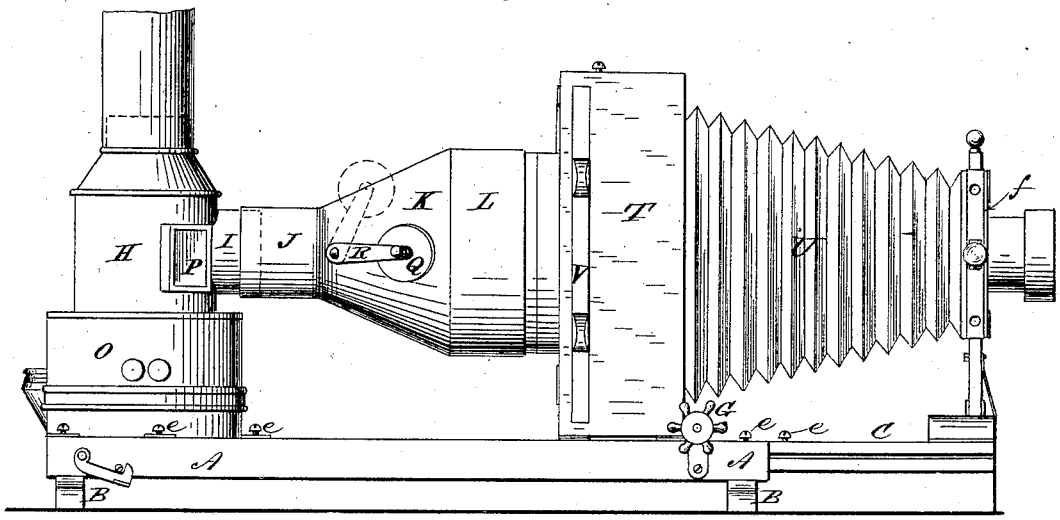
Figure 2:
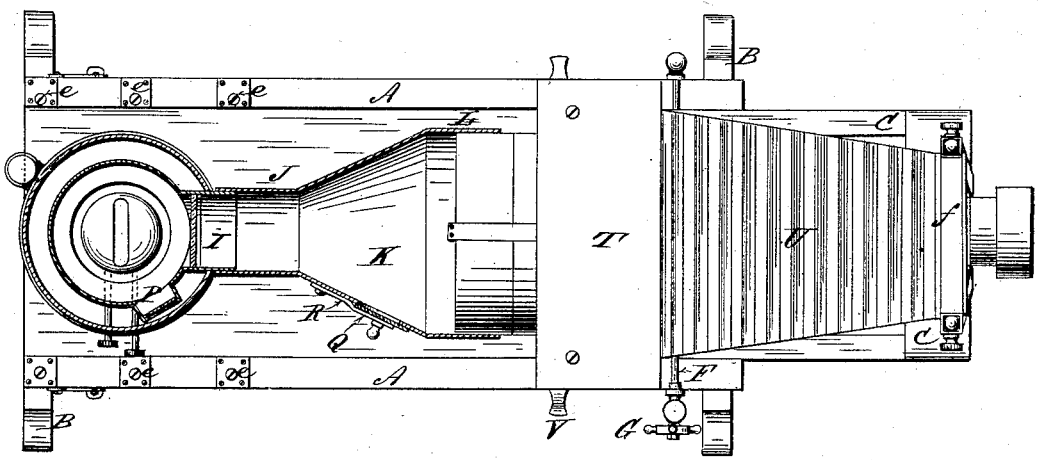
Figure 3:
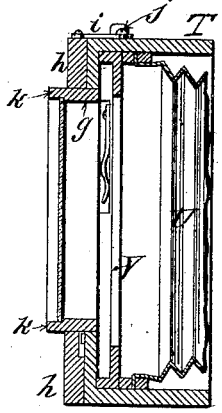
Figure 4:
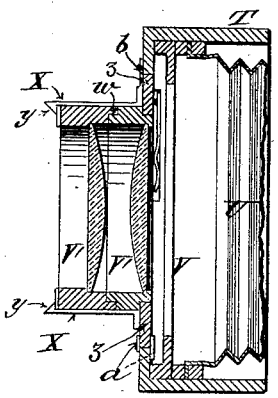
Figure 5:
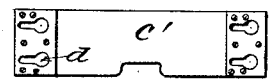
Figure 6:
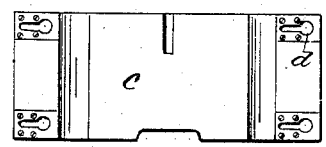
Figure 7:
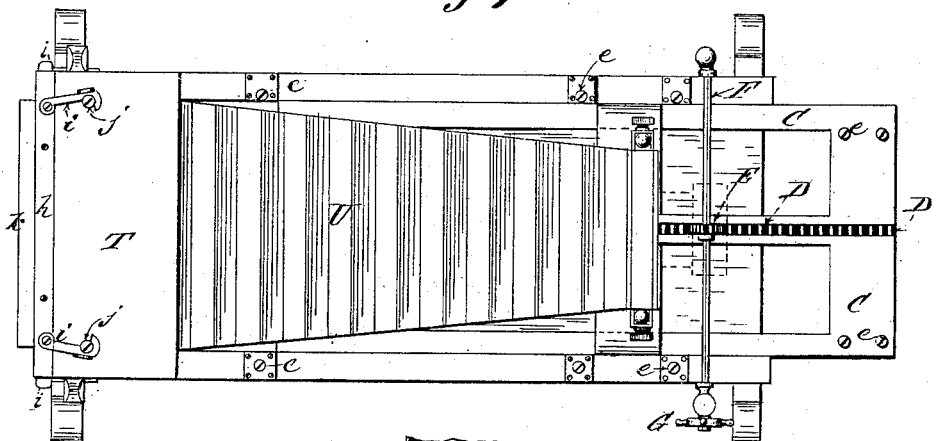
Figure 8:
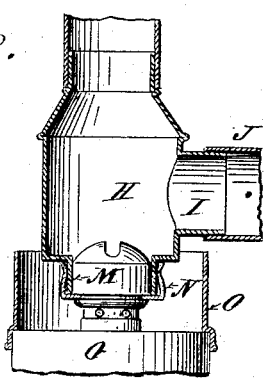

Figure 1 illustrates an elevation of the invention shown as in use with artificial light. Fig. 2 illustrates a top view of the same, partly in horizontal section. Fig. 3 illustrates a vertical section of the negative-holding frame with the ground-glass plate used in conjunction with daylight inserted in the frame in place of the lenses used with artificial light. Fig. 4 illustrates a vertical section, showing the construction of the condensing-lenses used with artificial light and their frames. Figs. 5 and 6 illustrate plan views of the slotted plates, whereby the lens-holding frames are attached to the base of the apparatus. Fig. 7 illustrates a top plan view of the instrument arranged for use with daylight. Fig. 8 illustrates a vertical section of the lamp.

A is the frame of the apparatus. It is preferably mounted on short cross-pieces B, which serve also as legs or supports for the apparatus.

C is a smaller frame, which slides endwise into the main frame, being supported and guided in any suitable manner. It is provided with a rack-bar, D, (see Fig. 7,) fastened centrally therein. In the claims hereof we shall refer to these two frames as the "base-frames."

E is a small pinion, which is fast on a cross-shaft, F, which is journaled on the base-frame A. This shaft is provided with a small hand-wheel, G, whereby the same is turned to move the sliding frame C in and out relative to the main frame.

H is the lamp used in connection with the apparatus for producing the artificial light. It is constructed in the usual manner, excepting in the following particulars: The upper part or dome of the lamp has a tube, I, projecting from one side thereof, through which the light is projected from a reflector placed in the opposite side of the lamp, as usual. This tube I has a telescoping movement in a corresponding tubular part, J, of a funnel-shaped part of the light-conveyer, marked K. At the larger end of the funnel-shaped part there is an enlarged cylindrical or tubular section, L, which has also a sliding or telescoping movement over the exterior of the frames which hold the condensing-lenses, as hereinafter set forth. Thus there are provided two adjustments of the lamp relative to these lenses, one by the telescoping of the tube I, attached to the lamp within the small tubular part J of the funnel-shaped piece, and another the sliding of the larger part L of the funnel-shaped piece over the outer surfaces of the said lens-holding frames; and in order that the flame of the lamp may be presented to the condensing-lenses flatwise or edgewise or at any intermediate angle, as may be preferred, the vertical base part M of the upper part of the lamp (see Fig. 8) is made of such size relative to the gallery N that the base of the lamp O and the burner attached to it may be freely turned in a circulatory manner upon the vertical axis of the lamp without turning the upper part or dome of the lamp. In this manner the operator may easily, by turning the base of the lamp O, present the flame to the lenses in such position as may be desired, and in order that the position of the flame may be readily ascertained we form a window, P, in the side of the dome of the lamp, in which a piece of glass or equivalent substance, colored to give non-actinic light, is placed, through which the flame may be seen, and also for a similar purpose a movable shutter, Q, covering a hole made in the side of the funnel-shaped light-conveyer, is provided, which is preferably, but not necessarily, attached to the free end of a pivoted spring, R, as shown, which, being pushed aside, as indicated in dotted lines, will allow an inspection of the first condensing-lens, in which the reflection of the flame will be seen, whereby its position or presentation relative to these lenses may be quickly determined.

T is a frame (see Fig. 4) which is mounted on the base-frame A. The usual extensible light-excluder, U, is attached to this frame, preferably in its interior, as shown, and the usual negative-bearing frame, V, is also adapted to slide laterally therein. In this Fig. 4 we show our improved frames for holding the condensing-lenses, there being two or more such lenses used of various kinds, as is well understood. (We show in the drawings two plano-convex lenses placed in the usual relations one to the other; but we do not limit ourselves to such lenses specifically.) In order that they may be readily accessible for cleaning, &c., we place each lens in a separate frame, V' V', which are united together by a tongue and rabbet or groove, (shown at $w$.) Two springs, X X, each having a catch, Y, on its outer end, are screwed to a frame, Z, which fits in the main frame T and is fastened therein by pieces of metal $a$, which lock over the bottom cross-piece of the frame T, and by a button, $b$, which is attached to the frame T, and is adapted to be turned over the upper edge of the frame Z when in place, although any other suitable means may be employed. By this construction the two frames V' V', containing the condensing-lenses, may be fitted together and placed in the frame Z. The spring-catches Y Y then spring over the outer edges of the outer lens-frame and hold all the parts together. The lenses may be removed and their several frames separated for cleaning the lenses by simply springing the spring-catches apart, which will release the lens-frames.

$c\ c'$ are respectively metallic plates which are provided with slots $d\ d$, adapted to fit over the heads of screws $e\ e$, or like devices which are partially projecting and located on the upper surfaces of the base-frames A and C. These plates $c\ c'$ are fastened on the under side of the vertical lens-holding frames T and $f$, whereby these frames can be shifted from one part of the main frames A and C to other parts, as desired, depending on the location of the screws $e\ e$. We lay no claim to these attaching-plates $c\ c'$, they having been patented prior to our invention. $f$ is the frame which holds the "objective" lens. It is, or may be, of any desired construction.

We have thus far described our invention as constructed and arranged for use with artificial light. To adapt the same instrument to use with daylight, we provide the following instrumentalities, (illustrated in Figs. 3 and 7:) First, we remove the lamp and funnel-shaped light-conveying tube, &c., and also remove the plate Z from the frame T, which of course takes away also the frames V' V', which hold the condensing-lenses, and leaves an opening in the rear of the frame T. Into this opening we then fit a wooden frame, $g$, (see Figs. 3 and 7,) which is provided with a ground glass for the purpose of diffusing the light. This frame $g$ has a laterally-extending flange, $h$, which is provided with clamps $i$, which engage with pins $j$ on the frame T, whereby the frame is held firmly in place. The frame $g$ is also provided with a projecting rim, $k$, whereby it may be properly engaged with the darkened window, as usual.

When the apparatus is used with daylight, the frame T is shifted from its position at the forward end of the base-frame A, as seen in Figs. 1 and 2, to the rear end thereof, as shown in Fig. 7, in order to obtain the proper focus, and it will sometimes happen that the distance of the screen from the camera will require such a focus that the frame $f$, which contains the objective lens, must be shifted from its position on the frame C in front of the shaft F, as shown in Figs. 1 and 2, to the rear thereof, as also shown in Fig. 7. The shifting of these frames from one part of the base-frames A and C to other parts is readily effected by the slotted plates $c\ c'$ and the partially-projecting screw-heads or equivalent devices above described, as is well understood.

The operation of the apparatus from the foregoing statements is obvious. When used with artificial light, the lamp is located in such relation to the condensing-lenses as will give the best illumination by means of the double adjustment of the funnel shaped light-conveyer already explained, and the preferred presentation of the flame to the condensing-lenses is secured by suitable turning of the base of the lamp, as also fully described, and the proper focus between the negative-plate and the objective lens is obtained by movement of the objective lens through the agency of the sliding frame C, which carries the frame $f$, it being operated by the pinion E and rack-bar D, as set forth, and when the apparatus is to be used with daylight, the lamp and the lenses V' V' are removed, as stated, and the day-frame $g\ h$ is substituted in the frame T, and the proper focus is obtained by locating the frames T and $f$ on the base-frames A and C, where required plus the supplemental movement of the objective lens by the sliding of the frame C, as already fully described.

We do not limit ourselves to the details of construction, excepting as the details may be hereinafter claimed, because it is evident that many alterations may be made in certain parts of our apparatus and still the essentials of our invention be employed.

We claim—

1. The combination of two base-frames having longitudinal movement relative to each other, a lens-bearing frame, and a negative-bearing frame, one attached to each of said base-frames, as described, and adjustable thereon, respectively, and a lamp having an adjustable light-conveyer and provided with a window in the dome thereof, through which the flame can be seen, the base and burner of said lamp being loosely connected with the upper part thereof, whereby the flame can be turned irrespective of the upper part of the lamp, and means to move the base frames longitudinally relative to each other, substantially as set forth.

2. The combination of two base-frames having longitudinal movement relative to each other, a lens-bearing frame, and a negative-bearing frame, one attached to each of said base-frames, as described, and adjustable thereon, respectively, and a lamp having an adjustable light-conveyer and provided with a window in the dome thereof, through which the flame can be seen, the base and burner of the lamp being loosely connected with the upper part thereof, whereby the flame can be turned irrespective of the upper part of the lamp, substantially as set forth.

3. The combination of two base-frames having longitudinal movement relative to each other, a lens-bearing frame, and a negative-bearing frame, one attached to each of said base-frames, as described, and a lamp having an adjustable light-conveyer and provided with a window in the dome thereof, the base and the burner of the lamp being loosely connected with the upper part thereof, whereby the flame can be turned irrespective of the upper part of the lamp, substantially as set forth.

4. The combination of two base-frames having longitudinal movement relative to each other, a lens-bearing frame, and a negative-bearing frame, one attached to each of said base-frames, as described, and a lamp having an adjustable light-conveyer provided with a covered peep-hole in the side thereof, whereby the position of the flame can be seen on the condensing-lens attached to the negative-bearing frame, the base and the burner of the lamp being loosely connected with the upper part thereof, whereby the flame can be turned irrespective of the upper part of the lamp, substantially as set forth.

5. The combination of two base-frames having longitudinal movement relative to each other, a lens bearing frame, and a negative-bearing frame, one attached to each of said base-frames, as described, a lamp having an adjustable light-conveyer, and means whereby the position of the flame can be observed, substantially as set forth.

6. The combination, in a projecting camera, of a lamp having an adjustable light-conveyer, the base and burner of the lamp being loosely connected to the upper part of the lamp, whereby the flame can be turned irrespective of the upper part of the lamp, and means for observing the position of the flame, substantially as set forth.

7. The described improvement in lamps for projecting cameras, consisting in an adjustable light-conveyer provided with means for observing the position of the flame relative to the condensing-lenses, substantially as set forth.

8. The combination of two base-frames longitudinally movable relative to each other, a lens-bearing frame, and a negative-bearing frame, one attached to each of the base-frames, attaching devices placed on the upper surface of each of the said base-frames, and counterpart attaching devices placed on the under side of the lens of the negative-bearing frames, respectively adapted to engage with the attaching devices on the base-frames, whereby the relative positions of the said parts can be altered at will, substantially as set forth.

9. The described improvement in frames for condensing-lenses, consisting in the combination of two or more frames each provided with a single condensing-lens, said several frames being rabbeted one into the other, and spring-catches attached to the frame which vertically supports the condensing-lenses, which spring-catches, when the lenses are in position, lock over the edge of the outer lens-frame and hold them all in position, substantially as set forth.

10. The combination, in a projecting camera, of a frame for supporting the negative, provided with an opening adapted to interchangeably receive a frame containing light-condensing lenses or a frame holding a ground-glass plate, and two base-frames longitudinally movable relative to each other, and means whereby the position of the frame for supporting the negative and the frame holding the objective lens may be attached to the base-frames at interchangeable places, substantially as set forth.

Signed at New York, in the county of New York and State of New York, this 19th day of May, A. D. 1887.

DAVID A. COOPER.
WILLIAM H. LEWIS.

Witnesses:
PHILLIPS ABBOTT,
GEORGE A. VOSS.